Aug. 24, 1965
J. J. SIMKO
3,202,036
BLIND FASTENER
Filed May 9, 1961
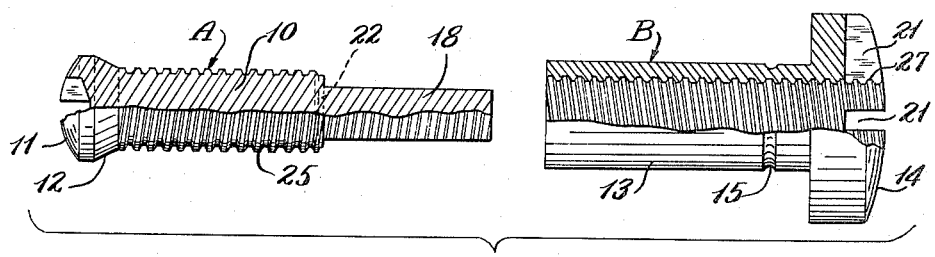
FIG. 1
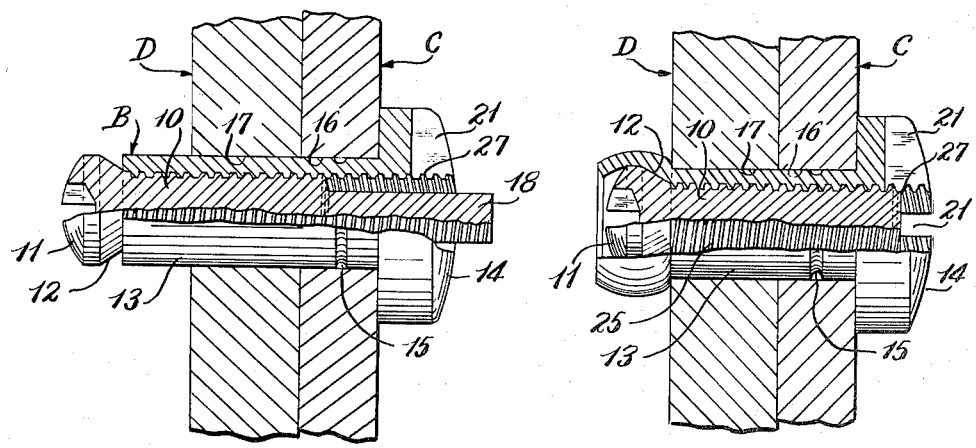
FIG. 2
FIG. 3
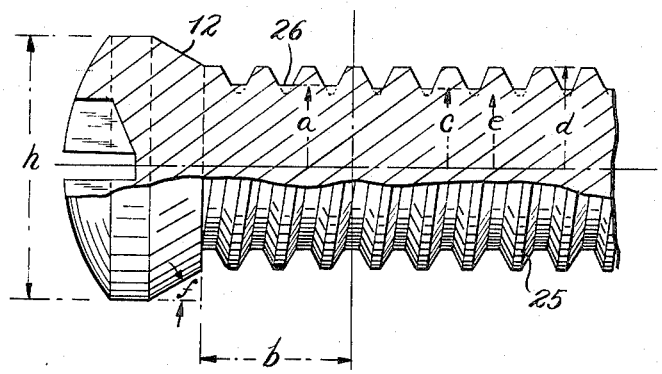
FIG. 4
INVENTOR.
JOHN J. SIMKO
BY
ATTORNEYS United States Patent Office 3,202,036
Patented Aug. 24, 1965

3,202,036
BLIND FASTENER
John J. Simko, Lyndhurst, Ohio, assignor to The National Screw & Manufacturing Company, Cleveland, Ohio, a corporation of Ohio
Filed May 9, 1961, Ser. No. 108,899
7 Claims. (Cl. 85—77)

The present invention relates to fasteners and, more particularly, to threaded fasteners having an interference lock between a portion of the threads thereof and to a method of producing such fasteners, and especially to so-called "blind" bolts.

The principal object of the invention is the provision of a novel and improved screw-type blind fastener especially designed for use in the aircraft, automotive and other industries which will be relatively inexpensive to produce, will fixedly hold the parts secured together thereby and which incorporate a thread interference lock for resisting and/or preventing unthreading of the screw and nut parts while the fastener is in use.

Another object of the invention is the provision of a novel and improved method of making a screw and nut combination threaded fastener having a thread interference lock created before the fastener is used by deforming inwardly a limited portion of the threads of the nut while assembled on the screw to force the deformed portion of the threads of the nut into tight engagement with the threads of the screw. The deformation may be produced by indenting a portion of the exterior of the nut as by an impact means.

The invention resides in certain constructions and arrangements of parts which will be hereinafter referred to in connection with the following description of the preferred embodiment described with reference to the accompanying drawings forming a part of this specification in which similar reference characters designate corresponding parts, and in which:

FIG. 1 is an expanded view of a fastener with parts broken away and in axial section to better show the construction;

FIG. 2 is an axial, sectional view, with portions in elevation, showing the fastener subsequent to the incorporation or provision therein of a thread interference lock and in position to be driven in two or more members to be secured together thereby;

FIG. 3 is a view similar to FIG. 2 but showing the fastener after being driven and fixedly securing the members together; and FIG. 4 is an enlarged, fragmentary, axial, sectional view of the head end of the blind member or screw of the fastener shown in the preceding views.

Referring to the drawings, the blind fastener shown has only two parts, a screw or mandrel A comprising a shank 10 having a head 11 at one end provided with an outwardly and rearwardly tapered or conical bearing face 12, and a combined nut and blind head member B comprising a cylindrical shank or body portion 13 having an external or non-blind head 14 at one end. The members A and B are also referred to as the blind or internal and non-blind or external members, respectively. The member B is threaded and is assembled on the shank 10 of the screw A with the heads 11, 14 at opposite ends of the fastener. A portion of the thread of the nut intermediate the ends thereof is formed undersize to provide a thread interference lock between the screw and nut preferably by rolling a groove 15 in the exterior of the body portion 13 of the nut adjacent to the head 14 but spaced slightly therefrom which contracts the internal thread, etc. underneath the groove to form a thread interference lock which when the fastener is driven prevents or resists unthreading of the nut and screw while the fastener is in use.

In use the assembled fastener is nserted with the screw head 11 leading into aligned holes in members to be secured together thereby, such as, the holes 16, 17 in the plate-like members C, D. The fastener is inserted from the accessible side of the member or plate C and is such that the blind end of the body portion 13 of the nut B projects beyond the inaccessible side of the member or plate D. After the fastener is assembled with the members to be secured together thereby in the manner described the fastener is driven or set by producing relative rotation between the screw A and the nut B to draw the head 11 of the screw A into the blind end of the nut B. This expands or flares the blind end of the nut B which extends beyond the nonaccessible side of the members to be secured together, over the tapered or conical bearing face 12 of the head 11 adjacent thereto and compresses and expands a portion of the body of the nut which is within the member D into tight engagement with the sides of the hole 17 therein.

The fastener is preferably set by rotating the screw A while the nut B is held stationary. When the fastener is set in this manner the blind head portion or end of the member B is expanded by relative rotation therebetween and the head 11 of the screw A. The operation is analogous to that of metal "spinning." When the fastener is driven to a predetermined tension, the plate-like members C, D are securely fixed together or clamped between the accessible head 14 of the nut B which engages the bers C, D are securely fixed together or clamped between to, and the blind head of the nut B formed by the expanded end of the nut and which blind head engages the nonaccessible side of the plate-like member D adjacent thereto.

The thread engagement between the screw A and the nut B, as viewed in FIG. 2, except for that underneath the depression or groove 15, is a clearance fit as defined in Screw-Thread Standards for Federal Services, Handbook H28 (1957) Part I, United, American, American National and National Miniature Threads, published by the United States Department of Commerce, National Bureau of Standards, preferably a class 2 or 3 American National or a 2A and 2B, or 3A and 3B Unified and American thread, and the thread underneath the groove or depression 15 is an interference fit preferably equivalent to the interference fit defined in said handbook. The screw and nut are preferably assembled and the groove 15 subsequently rolled in the nut. This forces the threads of the nut into or against the threads of the screw regardless of the exact clearance or tolerance between the two threads. The screw is preferably made of material harder than that of the nut with the result that as the threads of the nut underneath the groove 15 are forced against or into the threads of the screw, the threads of the screw are not deformed or, at least, materially deformed. Because of the impossibility of manufacturing the screw and nut threads commercially to exact size, it is impossible to control the amount of locking or interference obtained between the threads, if the unassembled parts are manufactured so as to have interference when assembled, to the same degree or nicety as is possible by forming the interference subsequent to assembly of the parts as described above. The ability to control the amount of interference and in turn, the amount of the thread lock present to a high degree of accuracy and to obtain uniformity thereof in fasteners of the same size is especially important in a blind fastener which is driven to a predetermined torque because variations in the interference fit by absorbing or requiring more or less of the driving torque will result in different fasteners being driven to varying tightness, that is, the fasteners will not all clamp up the same.

The maximum diameters of the head 11 of the screw A and the shank or body portion 13 of the nut B are substantially equal, and the hole or holes in the work are such that the fastener can be inserted therein by hand but will not be loose therein. Both the screw A and the nut B are provided with driving connections or means accessible at the exposed side of the plate C, which connections are adapted to be engaged by complementary connections on a driving tool. That portion of the shank 10 of the screw A which normally projects beyond the nut B when the bolt is driven, and which portion is designated as 18, is provided with means to be engaged by a driving tool. As shown, the two opposite sides of the portion 18 are flattened and is adapted to be engaged or received in a suitable, complementary aperture in the driving tool. The head 14 of the nut B shown is provided with slots or recesses 21 adapted to be engaged by projections on the tool to hold the nut B stationary while the screw A is rotated.

The shank 10 of the screw A is preferably weakened at the inner ends of the driving portion 18 as by the provision of a groove 22 which leaves a notched section of predetermined area and, when the fastener is used, the screw A is rotated until the driving end portion 18 breaks away from the shank 10 at the notched section. This assures tightening or driving of the fastener to a predetermined stress or load. The head 14 of the nut B as shown is of the brazier or pan type, but other types of heads may be employed, for example, countersunk, round, etc.

The shanks of the screws of fasteners of the type are preferably made to standard screw sizes, for example, 4–48, 6–40, 8–36, 10–32, 12–28, etc., and a given shank size predetermines, to some extent, the construction of the other parts, etc. In the embodiment shown, the thread 25 of the screw A extends along the shank 10 of the screw A to a point adjacent to the head 11. The effective diameter of a short portion or section 26 of the shank 10 of the screw adjacent to the head 11 is preferably increased 1% to 3% with reference to that of the remainder of the shank because this portion of the shank is subjected to a complex combination of shear, torsion and tensile stresses and loads, and is the part of the shank most likely to fail.

The threads of the screw are preferably formed on the shank 10 by thread rolling and the diameter $a$ for the length $b$ of the shank 10 which constitutes the section 26 may be increased over that of the rest of the threads of the shank by grinding off the crests of the threads of the dies along the head edge to produce a thread root diameter $a$ slightly larger than the thread root diameter $c$ of the remainder of the thread of the shank 10. In the embodiment shown, the effective diameter of the shank 10 to the right of the section 26 is increased with respect to that of a standard screw of the same size or thread diameter $d$ by grinding off the crests of the other threads of the dies to form a thread having a root diameter $c$ greater than the standard root diameter $e$ for the same thread diameter $d$ but not sufficiently great to cause interference therebetween and the internal mating thread 27 in the nut B which is preferably formed with a standard tap. This feature may or may not be employed as desired.

In practice, fasteners of the type shown are made in different lengths, each designed to fasten two or more members together having an overall thickness within fairly wide limits, and the lengths of the respective parts while being made as short as possible consistent with other requirements in an effort to save weight, etc., are preferably so proportioned that when the bolt is in use or driven, the blind end of the nut B projects over the head 11 of screw A. The material of the blind end of the nut B is such as are the dimensions of the various parts that during the driving operation the threads in that portion of the nut B, which is expanded over the head 11 of the screw A, are deformed and as the blind end of the nut is expanded over the head 11 of the screw severe stresses are set up therein which exceed the yield strength of the material but are not great enough to cause the material to take a permanent set at its maximum expansion and as the head of the screw moves inwardly beyond the blind end of the nut relaxation of these stresses in the end which extends beyond the head 11 of the screw A causes or permits the end of the nut to contract slightly over the blind side of the head 11 thereby further locking the nut and screw together against unthreading in addition to the thread interference lock previously referred to. This feature is shown in FIG. 3 of the drawings for purposes of illustration, however, the extent to which the blind end of the nut contracts is exaggerated in the drawings.

The blind end of the nut B of the fastener, if desired, may be made slightly smaller in diameter that that of the portion adjacent to the head and in turn slightly smaller than the hole or holes in the members to be secured together. This modification of the nut, at least under some conditions, improves the clamping action of the fastener and results in the parts being clamped tighter together upon the driving of the fastener than would otherwise be the case. The optimum reduction in the diameter of the blind end of the body portion of the nut with respect to the diameter of the main body portion thereof is approximately 4%, that is, the diameter of the reduced end of the nut should be equal to approximately 96% of the diameter of the main body portion. As previously stated, in practice the fasteners are made in different lengths each designed to fasten two or more members together having an overall thickness within fairly wide limits. These limits are more commonly referred to as the maximum and minimum grip lengths of the fastener and the length of the body portion of the nut which is of full diameter should be approximately equal to the mean grip length less one-fourth of the difference between the maximum and minimum grip lengths.

The screw A is preferably made of a heat treatable alloy or carbon steel. The nut B which must be relatively ductile is preferably made of a commercial low carbon steel heat treated to obtain the desired characteristics but may be made of any suitable material, such as, aluminimum or a corrosion-resistant steel sensitive to coldworking, that is, a steel capable of having its hardness and strength improved by cold-working, for example, AN–QQ–771. As an alternative construction, the nut B may be made of hard and non-ductile material like the screw B and the blind end annealed or otherwise treated to produce the desired characteristics.

The angle I of taper of the tapered or conical portion 12 of the head A is reasonably critical as the longitudinal and radial forces produced thereby against the end of the nut B must be proportioned within the limits of the material used. The angle of the bevel should be not less than about 20° or greater than about 30° with reference to the longitudinal axis of the screw. An angle of 25° is preferred. The diameter $h$ of the head of the screw A is preferably about one and five-eighths to about one and three-quarter times the thread root diameter of the screw.

From the foregoing it will apparent that the objects heretofore enumerated and others have been accomplished and that there has been provided a novel and improved thread type blind fastener or bolt, having an interference-type thread lock incorporated therein at the time of manufacture the degree or the extent of which can be consistently reproduced so that it will not interfere with the driving or setting of successive fasteners of the same size to the same tightness by power tools, which will allow the nut to be freely started on the screw as the parts are initially assembled together, and which will securely hold the assembled screw and nut together under extremely unfavorable conditions of vibration, etc.

While the preferred embodiments of the invention have been described in considerable detail it is my intention to cover hereby all adaptations, modifications and uses of the fastener shown and of the method described which come within the practice of those skilled in the art to which the invention relates and within the scope of the appended claims.

Having described my invention, what I claim is:

1. As an article of commerce a structural type blind fastener of the bolt or screw type adapted to be driven to a predetermined torque in securing together a plurality of structures having aligned apertures therein forming a passage therethrough accessible from only one side: a first member comprising a cylindrical body having an external thread and a circular head at one end provided with a bearing face inclined outwardly away from said body, a driving connection at the end of said body opposite said head, and a weakened section between said body and said driving connection adapted to break when subjected to a predetermined torque; a second member comprising an internally threaded cylindrical tubular-like body portion having an outside diameter substantially equal to the diameter of said head of said first member threaded onto said cylindrical body of said first member and an integral head at the end of said tubular-like body remote from said head of said first member, said head of said first member being located without the adjacent end of said second member and adapted to be drawn therein to expand said adjacent end of said second member upon relative axial movement between said members incident to setting or driving the fastener; the major portion of said exterior and interior threads of said first and second members interengaging with clearance fit, as defined in Handbook H28 (1957), National Bureau of Standards; a formed annular groove in said tubular-like body portion of said second member produced with said first and second members assembled with one another as aforesaid; and at least one uninterrupted annular portion of limited axial length of said exterior and interior threads of said first and second members formed by the inward deformation of the metal of said tubular-like body portion of said second member by the formation of said groove therein, interengaging with an interference fit, as defined by said handbook, forming a friction-type thread interference lock between said first and second members.

2. As an article of commerce a structural type blind fastener of the bolt or screw type adapted to be driven to a predetermined torque in securing together a plurality of structures having aligned apertures therein forming a passage therethrough accessible from only one side; a first member comprising a cylindrical body having an external thread and a circular head at one end provided with a bearing face inclined outwardly away from said body, a driving connection at the end of said body opposite said head, and a weakened section between said body and said driving connection adapted to break when subjected to a predetermined torque; a second member comprising an internally threaded cylindrical tubular-like body portion having an outside diameter substantially equal to the diameter of said head of said first member and a wall thickness not greater than 0.4 times the pitch diameter of said internal thread therein threaded onto said cylindrical body of said first member and an integral head at the end of said tubular-like body thereof remote from said head of said first member said head of said first member being located without the adjacent end of said second member and adapted to be drawn therein to expand said adjacent end of said second member upon relative axial movement between said members incident to setting or driving the fastener, the major portion of said exterior and interior threads of said first and second members interengaging with clearance fit, e.g. class 2A and 2B or a class 3A and 3B, as defined in Handbook H28 (1957), National Bureau of Standards; a rolled annular groove in said tubular-like body portion of said second member produced with said first and second members assembled with one another as aforesaid; and at least one uninterrupted annular portion of limited axial length of said exterior and interior threads of said first and second members formed by the inward deformation of the metal of said tubular-like body portion of said second member by the formation of said groove therein, interengaging with an interference fit, as defined by said handbook, forming a friction-type thread interference lock between said first and second members.

3. As an article of commerce a structural type blind fastener of the bolt or screw type adapted to be driven to a predetermined torque in securing together a plurality of structures having aligned apertures therein forming a passage therethrough accessible from only one side: a first member comprising a cylindrical body having an external thread and a circular head at one end having a diameter approximately 1.6 to 1.8 times the pitch diameter of the external thread on said cylindrical body provided with a bearing face inclined outwardly away from said body, a driving connection at the end of said body opposite said head, and a weakened section between said body and said driving connection adapted to break when subjected to a predetermined torque; a second member comprising an internally threaded cylindrical tubular-like body portion having an outside diameter substantially equal to the diameter of said head of said first member threaded onto said cylindrical body of said first member and an integral head at the end of said tubular-like body thereof remote from said head of said first member, said head of said first member being located without the adjacent end of said second member and adapted to be drawn therein to expand said adjacent end of said second member upon relative axial movement between said members incident to setting or driving the fastener, the major portion of said exterior and interior threads of said first and second members interengaging with clearance fit, e.g. class 2A and 2B or a class 3A and 3B, as defined in Handbook H28 (1957) National Bureau of Standards; a rolled annular groove in said tubular-like body portion of said second member produced with said first and second members assembled with one another as aforesaid; and at least one uninterrupted annular portion of limited axial length of said exterior and interior threads of said first and second members formed by the inward deformation of the metal of said tubular-like body portion of said second member by the formation of said groove therein, interengaging with an interference fit, as defined by said handbook, forming a friction-type thread interference lock between said first and second members.

4. As an article of commerce a structural type blind fastener of the bolt or screw type adapted to be driven to a predetermined torque in securing together a plurality of structures having aligned apertures therein forming a passage therethrough accessible from only one side: a first member comprising a cylindrical body having an external thread and a circular head at one end with a bearing surface on the side thereof adjacent to said cylindrical body inclined outwardly away from said body at an angle of approximately 20° to 30° and a diameter approximately 1.6 to 1.8 times the pitch diameter of said external thread, a driving connection at the end of said cylindrical body opposite said head, and a weakened section between said cylindrical body and said driving connection adapted to break when subjected to a predetermined torque, said body being of such length that said head will be located behind the nonaccessible side of the structures with which it is used when said fastener is assembled with said structures preparatory to driving; and a second member comprising an internally threaded cylindrical tubular-like body portion having an outside diameter substantially equal to the diameter of said head of said first member and a wall thickness not greater than 0.4 times the pitch diameter of said internal thread therein threaded onto said cylindrical body of said first member and an integral head at the end of said tubular-like body thereof remote from said head of said first member, said head of said first member being located without the adjacent end of said second member and adapted to be drawn therein to expand said adjacent end of said second member upon relative axial movement between said members incident to setting or driving the fastener, the major portion of said exterior and interior threads of said first and second members interengaging with clearance fit, e.g. class 2A and 2B or a class 3A and 3B, as defined in Handbook H28 (1957) National Bureau of Standards; a rolled annular groove in said tubular-like body portion of said second member produced with said first and second members assembled with one another as aforesaid; and at least one uninterrupted annular portion of limited axial length of said exterior and interior threads of said first and second members formed by the inward deformation of the metal of said tubular-like body portion of said second member by the formation of said groove therein, interengaging with an interference fit, as defined by said handbook, forming a friction-type thread interference lock between said first and second members.

5. The method of making a structural type blind fastener of the bolt or screw type adapted to be driven to a predetermined torque in securing together a plurality of structures having aligned apertures forming an opening therethrough accessible from only one side which method comprises: separately producing a first member having a cylindrical body portion, a circular head at one end of said body portion inclined outwardly away from said body portion, a driving connection at the end of said body portion opposite said head, and a weakened section between said body portion and said driving connection adapted to break when subjected to a predetermined torque; producing an external class 2A or 3A thread on said cylindrical body portion of said first member as defined in Handbook H28 (1957); separately producing a second member having a cylindrical tubular-like body portion and an integral head at one end of said tubular-like body portion; producing an internal class B2 or class B3 thread in said tubular-like body portion of said second member to interengage with said external threads of said body portion of said first member; assembling said first and second members by threading the same together with their respective said heads adjacent to opposite ends of the fastener and with said head of said first member without the adjacent end of said second member; deforming inwardly a limited annular portion of said tubular-like body portion of said second member adjacent to said head thereof with said members assembled as aforesaid by localized rolling pressure applied to the exterior of said tubular-like body portion of said second member to engage said external thread of said first member with a predetermined interference fit as defined in said handbook to form a thread interference lock.

6. The method of making a structural blind fastener of the bolt or screw type adapted to be driven to a predetermined torque in securing together a plurality of structures having aligned apertures forming an opening therethrough accessible from only one side which method comprises: separately producing a first member having an externally threaded cylindrical body portion, a circular head at one end of said body portion inclined outwardly away from said body portion of a diameter of said external thread, a driving connection at the end of said body portion opposite said head, and a weakened section between said body portion and said driving connection adapted to break when subjected to a predetermined torque; producing an external class 2A or 3A thread on said cylindrical body portion of said first member as defined in Handbook H28 (1957), separately producing a second member having a cylindrical tubular-like body portion and an integral head at one end of said tubular-like body portion; producing an internal class 2B or class 3B thread in said tubular-like body portion of said second member to interengage with said external threads of said body portion of said first member; assembling said first and second members by threading the same together with their respective said heads adjacent to opposite ends of the fastener so as to have a clearance fit as defined in said handbook, e.g. class 2A and 2B or a class 3A and 3B and with said head of said first member without the adjacent end of said second member; deforming inwardly a limited annular portion of said tubular-like body portion of said second member adjacent to said head thereof with said members assembled as aforesaid by localized rolling pressure applied to the exterior of said tubular-like body portion of said second member to cause a limited portion of said internal thread of said tubular-like body portion of said second member to engage said external thread of said first member with a predetermined interference fit as defined in said handbook to form a thread interference lock.

7. The method of making a structural type fastener of the bolt or screw type adapted to be driven to a predetermined torque in securing together a plurality of structures having aligned apertures forming an opening therethrough accessible from only one side which method comprises: separately producing a first member formed of relatively nonductile material having an external threaded cylindrical body portion, a circular head at one end provided with a bearing surface on the side thereof facing said body portion inclined outwardly away from said body portion at an angle of approximately 20° to 30° and a diameter approximately 1.6 to 1.8 times the pitch diameter of said external thread, a driving connection at the end of said body portion opposite said head, and a weakened section between said portion and said driving connection adapted to break when subjected to a predetermined torque; producing an external class 2A or 3A thread on said cylindrical body portion of said first member as defined in Handbook H28 (1957); separately producing a second member having a cylindrical tubular-like body portion having an outside diameter substantially equal to the diameter of said head of said first member and a wall thickness not greater than about 0.4 times the pitch diameter of said external thread on said body portion of said first member, an integral head at one end of said tubular-like body portion of said second member, and a blind head part at the opposite end from said head; producing an internal class B2 or class B3 thread in said tubular-like body portion of said second member to interengage with said external threads of said body portion of said first member; assembling said first and second members by threading the same together with their respective said heads adjacent to the opposite ends of the fastener so as to have a clearance fit as defined in said handbook, e.g. class 2A and 2B or a class 3A and 3B and with said head of said first member without the adjacent end of said second member; deforming inwardly a limited annular portion of said tubular-like body portion adjacent to said head thereof of said second member with said members assembled as aforesaid by localized rolling applied to the exterior of said tubular-like body portion of said second member to cause a limited portion of said internal thread of said tubular-like body portion of said second member to engage said external thread of said first member with a predetermined interference fit as defined in said handbook to form a thread interference lock.

References Cited by the Examiner

UNITED STATES PATENTS 426,185    4/90    Ibbotson.
1,313,075    8/19    Duke.

(Other references on following page)

UNITED STATES PATENTS

| | | | |
|---|---|---|---|
| 2,064,342 | 12/36 | England | 29—517 |
| 2,255,384 | 9/41 | Hood | 151—22 |
| 2,406,157 | 8/46 | Nelson | 85—77 |
| 2,408,559 | 10/46 | Keating | 85—77 |
| 2,765,699 | 10/56 | La Torre. | |
| 2,784,758 | 3/57 | Rohe. | |
| 2,948,170 | 8/60 | Kemp | 29—517 |
| 2,974,558 | 3/61 | Hodell | 85—77 |
| 3,129,630 | 4/64 | Wing et al. | |

EDWARD C. ALLEN, *Primary Examiner.*

CARL W. TOMLIN, *Examiner.*